United States Patent
McLaughlin et al.

(10) Patent No.: US 8,667,380 B2
(45) Date of Patent: Mar. 4, 2014

(54) SECURE COMMUNICATION USING NON-SYSTEMATIC ERROR CONTROL CODES

(75) Inventors: Steven William McLaughlin, Decatur, GA (US); Demijan Klinc, Atlanta, GA (US); Jeongseok Ha, Daejeon (KR)

(73) Assignees: Georgia Tech Research Corporation, Atlanta, GA (US); Korea Advanced Institute of Science and Technology (KAIST) (KR)

( * ) Notice: Subject to any disclaimer, the term of this patent is extended or adjusted under 35 U.S.C. 154(b) by 250 days.

(21) Appl. No.: 13/123,669

(22) PCT Filed: Oct. 8, 2009

(86) PCT No.: PCT/US2009/059974
§ 371 (c)(1), (2), (4) Date: Jun. 22, 2011

(87) PCT Pub. No.: WO2010/042702
PCT Pub. Date: Apr. 15, 2010

(65) Prior Publication Data
US 2011/0246854 A1 Oct. 6, 2011

Related U.S. Application Data

(60) Provisional application No. 61/103,951, filed on Oct. 9, 2008.

(51) Int. Cl.
*H03M 13/03* (2006.01)
*H03M 13/00* (2006.01)

(52) U.S. Cl.
USPC .......................................... 714/790; 714/801

(58) Field of Classification Search
USPC ......... 714/746, 752, 704, 790, 755, 801, 758; 380/270, 255
See application file for complete search history.

(56) References Cited

U.S. PATENT DOCUMENTS

| | | | |
|---|---|---|---|
| 5,604,806 A | 2/1997 | Hassan et al. | |
| 5,745,502 A | 4/1998 | Khayrallah et al. | |
| 7,020,701 B1 | 3/2006 | Gelvin et al. | |
| 2008/0168337 A1 | 7/2008 | Gaal et al. | |
| 2008/0219447 A1 | 9/2008 | McLaughlin | |
| 2010/0275093 A1* | 10/2010 | McLaughlin et al. | 714/752 |

OTHER PUBLICATIONS

International Search Report, mailed Jan. 13, 2010.

* cited by examiner

*Primary Examiner* — Phung M Chung
(74) *Attorney, Agent, or Firm* — Thomas|Horstemeyer, LLP

(57) ABSTRACT

A transmitter device (110T) for secure communication includes: an encoder (170) configured to apply a non-systematic error correcting code (NS ECC) to a message, thus producing encoded bits with no clear message bits; and a transceiver (720) configured to transmit the encoded bits over a main channel to a receiver. A method for secure communication includes: encoding a message with an NS ECC to produce an encoded message carrying no message bits in the clear; and transmitting the encoded message over a main channel (120). The NS ECC characteristics result in an eavesdropper channel error probability under a security threshold (320) and a main channel error probability over a reliability threshold (310), whenever an eavesdropper (140) listening on an eavesdropper channel (150) is more than distance Z (220) from the transmitter. Unreliable bits in the encoded bits render the eavesdropper unable to reliably decode messages on the main channel.

12 Claims, 9 Drawing Sheets

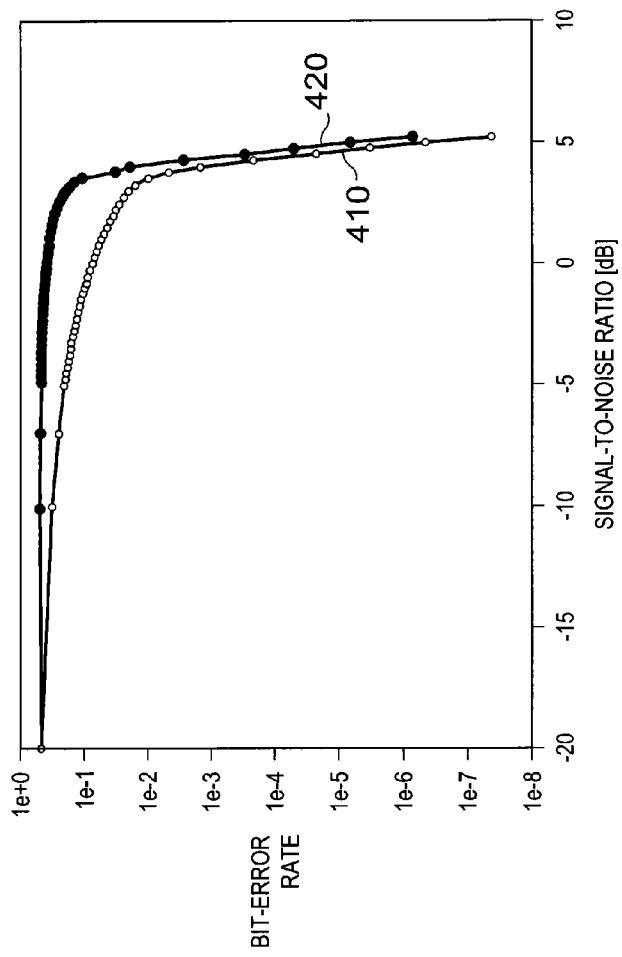

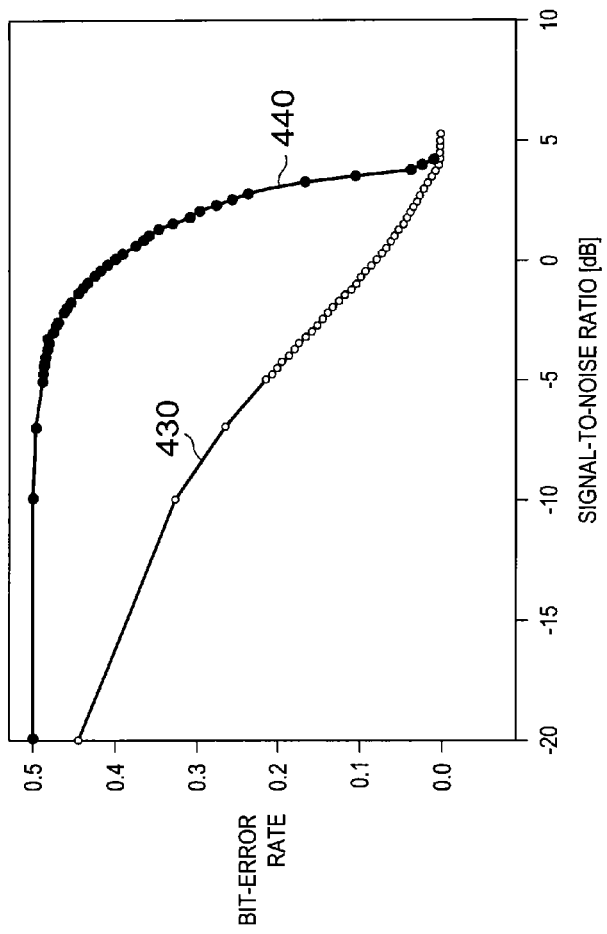

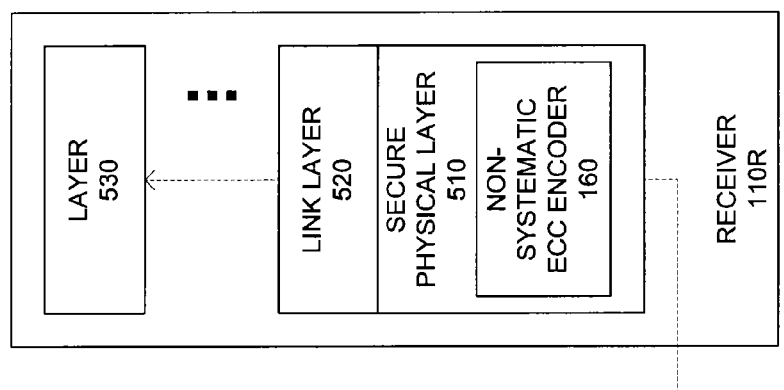
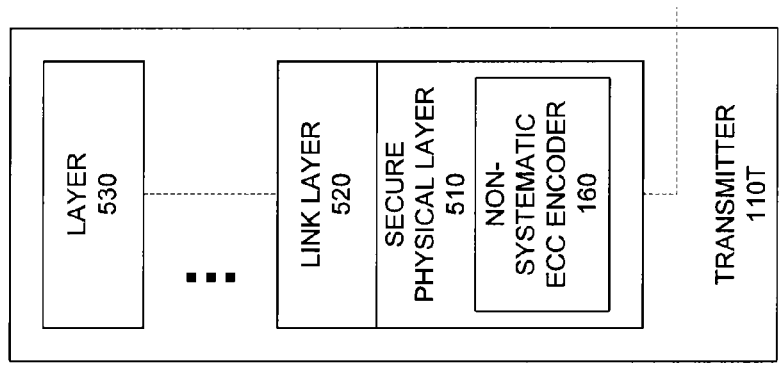
FIG. 5

SECURE COMMUNICATION USING NON-SYSTEMATIC ERROR CONTROL CODES

CROSS-REFERENCE TO RELATED APPLICATION

This application is a co-pending application which claims priority to PCT Application No. PCT/US2009/59974, filed, 8 Oct. 2009, entitled "Secure Communication Using Non-Systematic Error Control Codes" which claims priority to U.S. Patent Application No. 61/103,951, filed on 9 Oct. 2008 each of these applications being incorporated herein by reference in their entirety.

STATEMENT REGARDING FEDERALLY SPONSORED RESEARCH OR DEVELOPMENT

This invention was made with Government support under Agreement/Contract Number CCF-0634952, awarded by National Science Foundation. The Government has certain rights in the invention.

FIELD OF THE DISCLOSURE

The present disclosure relates to data communication, and more specifically, to secure communication using non-systematic error control codes.

BACKGROUND

The conventional method of providing secure communication over a channel uses cryptography. Cryptography relies on the existence of codes that are "hard to break": that is, one-way functions that are believed to be computationally infeasible to invert. Cryptography has become increasingly more vulnerable to an increase in computing power and to the development of more efficient attacks. Furthermore, the assumptions about the hardness of certain one-way functions have not been proven mathematically, so cryptography is vulnerable if these assumptions are incorrect.

Another weakness of cryptography is the lack of no precise metrics or absolute comparisons between various cryptographic algorithms, showing the trade off between reliability and security as a function of the block length of plaintext and ciphertext messages. Instead, a particular cryptographic algorithm is considered "secure" if it survives a defined set of attacks, or "insecure" if it does not.

Cryptography as applied to some media (e.g., wireless networks) also requires a trusted third party as well as complex protocols and system architectures. Therefore, a need exists for these and other problems to be addressed.

SUMMARY

Disclosed herein are systems and methods for secure communication. One such method is performed in a system involving a transmitter device, a receiver device, and an eavesdropper device. The transmitter device transmits to a receiver device on a main channel. The eavesdropper device listens on an eavesdropper channel to the transmitter device. The main channel has a signal-to-noise ratio $SNR_M$, and the eavesdropper channel has a signal-to-noise ratio $SNR_E$. This method includes: encoding a message with a non-systematic error correcting code (NS ECC) to produce an encoded message carrying no bits of the message in the clear; and transmitting the encoded message to the receiver over the main channel. The NS ECC has a set of defined characteristics such that when the eavesdropper device is more than a predetermined distance Z from the transmitter, at least a predefined fraction of the message is unreliable. The predefined fraction of unreliable bits renders the eavesdropper unable to reliably decode messages on the main channel.

Also disclosed is a transmitter for secure communication in a system involving the transmitter device, a receiver device, and an eavesdropper device. The transmitter device transmits to the receiver device on a main channel. The eavesdropper device listening on an eavesdropper channel to the transmitter device. The main channel has a signal-to-noise ratio $SNR_M$, and the eavesdropper channel has a signal-to-noise ratio $SNR_E$. The transmitter comprises: an encoder configured to apply a non-systematic error correcting code (NS ECC) to a message, thus producing a plurality of encoded bits that includes no clear bits from the message; and a transceiver configured to transmit the encoded plurality of bits to the receiver over the main channel. The NS ECC has a set of defined characteristics such that when the eavesdropper device is more than a predetermined distance Z from the transmitter, a bit error probability on the eavesdropper channel does not exceed a predetermined security threshold while a bit error probability on the main channel does exceed a predetermined reliability threshold, the plurality of encoded bits including a fraction of unreliable bits which render the eavesdropper unable to reliably decode messages on the main channel.

Also disclosed is a system for secure communication. The system comprises: a receiver device; and a transmitter device in communication with the receiver device over a main channel. The transmitter device is configured to communicate all bits of an original message without transmitting any of the bits in the clear, by applying a non-systematic error correcting code (NS ECC) and transmitting only a portion of the encoded bits. The receiver device is configured to recover all bits of the original message from the transmitted encoded bits. The NS ECC has a set of defined characteristics such that when an eavesdropper device listening on an eavesdropper channel to the transmitter device is more than a predetermined distance Z from the transmitter, a bit error probability on the eavesdropper channel does not exceed a predetermined security threshold while a bit error probability on the main channel does exceed a predetermined reliability threshold. The encoded message including a fraction of unreliable bits which render the eavesdropper unable to reliably decode the message on the main channel.

Also disclosed is a transmitter device for secure communication in a system involving the transmitter device, a receiver device, and an eavesdropper device. The transmitter device transmits to the receiver device on a main channel. The eavesdropper device listens on an eavesdropper channel to the transmitter device. The main channel has a signal-to-noise ratio $SNR_M$ and the eavesdropper channel has a signal-to-noise ratio $SNR_E$. The transmitter device comprises: a physical layer component of a protocol stack, and an RF transceiver. The physical layer component is configured to receive a message from another component of a protocol stack that is logically located above the physical layer component in the protocol stack. The physical layer component comprises an encoder. The encoder is configured to apply a non-systematic error correcting code (NS ECC) to the message, thus producing a plurality of encoded bits that includes no clear bits from the message. The RF transceiver is configured to transmit the encoded plurality of bits to the receiver over the main channel.

Also disclosed is an encoder residing in a transmitter device. The encoder provides secure communication in a system involving the transmitter device, a receiver device, and an eavesdropper device. The transmitter device transmits to the receiver device on a main channel. The eavesdropper device listens on an eavesdropper channel to the transmitter device. The main channel has a signal-to-noise ratio $SNR_M$. The eavesdropper channel has a signal-to-noise ratio $SNR_E$. The encoder comprises: coding logic configured to apply a non-systematic error correcting code (NS ECC) to a message, thus producing a plurality of encoded bits that includes no clear bits from the message; and puncture logic configured to puncture at least a portion of the encoded bits and to provide the punctured bits for transmission over the main channel. The NS ECC jas a set of defined characteristics such that when the eavesdropper device is more than a predetermined distance Z from the transmitter, a bit error probability on the eavesdropper channel does not exceed a predetermined security threshold while a bit error probability on the main channel does exceed a predetermined reliability threshold. The plurality of encoded bits includes a fraction of unreliable bits which render the eavesdropper unable to reliably decode messages on the main channel.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIGS. 4A and 4B are graphs illustrating performance of a non-systematic ECC as compared to a systematic ECC, according to embodiments described herein.

FIG. 5 is a logical block diagram of a system with a secure physical layer, according to some embodiments described herein.

DETAILED DESCRIPTION

Figure 1:
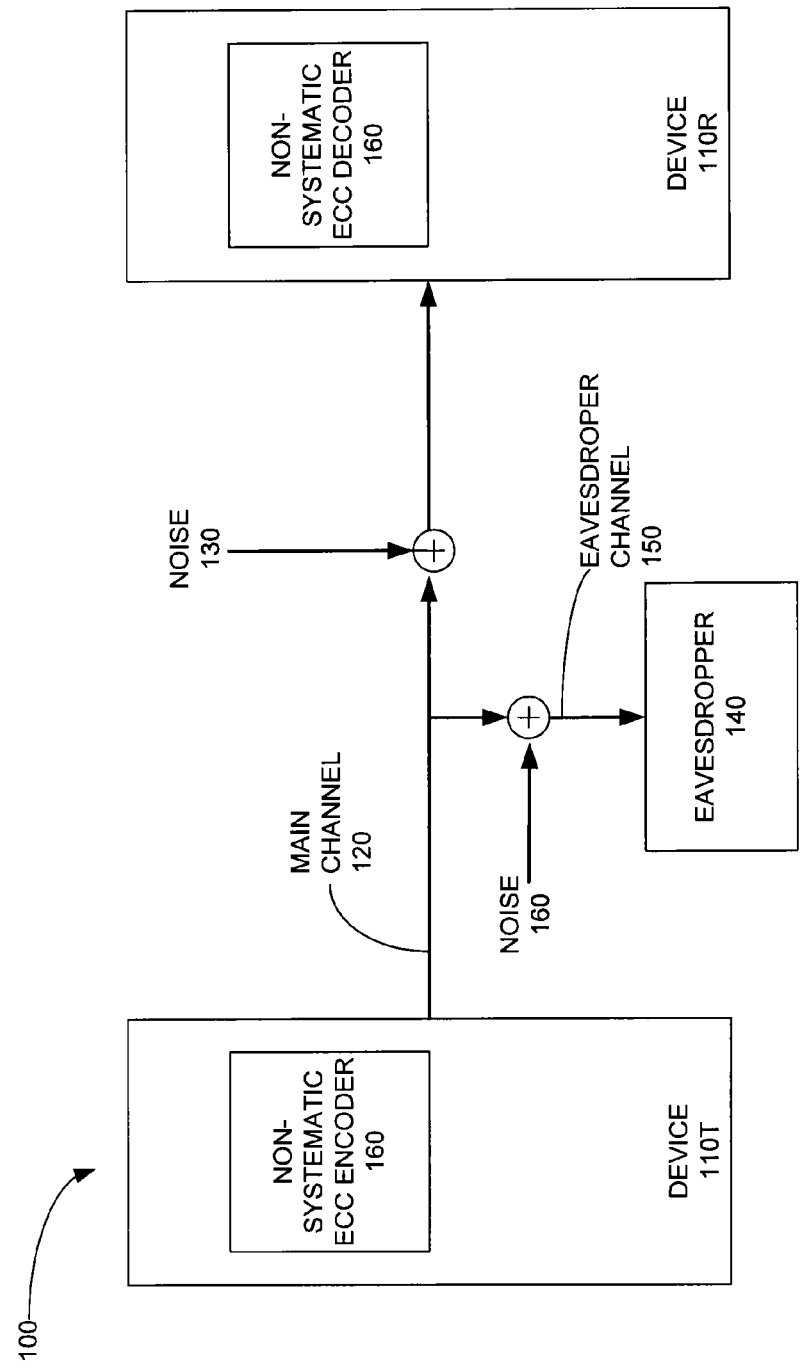
FIG. 1 is a block diagram of a transmitter device and a receiver device utilizing non-systematic error correcting codes, according to some embodiments described herein.

FIG. 1 is a block diagram of a transmitter device and a receiver device utilizing non-systematic error correcting codes to provide secure communication. System 100 includes two "friendly parties": device 110T, operating as a transmitter; and 110R, operating as a receiver. A person of ordinary skill in the art would understand that some embodiments of device 110 are have both transmitter and receiver functionality. Transmitter 110T and receiver 110R are in communication over a main channel 120, which is subject to a noise input 130.

System 100 also includes another device 140 (an "eavesdropper") which is capable of listening to (eavesdropping on) transmissions on main channel 120, over an eavesdropper channel 150. Eavesdropper channel 150 is subject to a noise input 160. Eavesdropper 140 is passive with respect to main channel 120, i.e., eavesdropper 140 does not jam main channel 120, insert bits on main channel 120, etc. In some embodiments, main channel 120 and eavesdropper channel 150 are wireless. In one of these embodiments, transmitter 110T takes the form of a radio frequency identification (RFID) tag. In still other embodiments, main channel 120 and eavesdropper channel 150 are wired (wireline) channels.

The embodiments described herein utilize non-systematic error correcting codes to insure communication between friendly parties that is both reliable and secure, by taking advantage of environments in which main channel 120 (the channel between "friendly" and a "friendly" receiver) always has positive secrecy capacity. Positive secrecy capacity is assured when the eavesdropper is more than a certain distance away from the friendly transmitter, thus guaranteeing that the signal quality on the message channel is better than the signal quality on the eavesdropper channel.

In the real world, this assumption is perhaps most reasonable when the distance between friendly transmitter and the friendly receiver is on the order of a few meters. One non-limiting example of such a scenario is a radio frequency identification (RFID) tag transmitting to a RFID reader. In such cases, an eavesdropper that is on the order of tens of meters away from the friendly transmitter has a signal quality that is hundreds of times worse than that of the main message channel (since the signal power is proportional to the square of the distance). However, the techniques described herein are applicable in any scenario where the message channel has positive secrecy capacity. The laws of physics guarantee that the signal quality will be lower for the eavesdropper as long as the eavesdropper is physically farther than a certain distance away from the friendly transmitter than the friendly receiver is. The relative antenna sizes of the friendly parties and the eavesdropper determine the specific distance between the eavesdropper and the friendly transmitter that is required for positive secrecy capacity to be obtained. In other words, the techniques described below can guarantee a perfect secrecy zone of size Z around the friendly transmitter, given a specific set of antenna sizes.

Transmitter 110T includes an encoder 170 which applies one or more non-systematic error correcting codes (ECC) during message transmission. Receiver 110R includes a complementary decoder 180. As should be known to a person of ordinary skill in the art, an ECC generates blocks of coded bits (codewords) from blocks of message (data) bits. As the term is used herein, an ECC is described as "systematic" when all message bits of a k-bit message are present and unchanged in some k positions of the codeword, i.e., the message bits are carried in the clear (as plaintext). Thus, codewords produced by a systematic ECC provide error correction, but not security. In contrast, an ECC is described as "non-systematic" when no message bits are carried in the clear, and every bit in the codeword is instead a function of the message bits. In this manner, non-systematic ECCs provide security because the decoder must perform an operation on the codeword to recover the message bits. Thus, non-systematic ECC encoder 170 cooperates with non-systematic ECC decoder 180 to provide secure communication over main channel 120.

Some embodiments of non-systematic ECC encoder 170 "puncture" (remove) all message bits. Other embodiments use a code in which every codeword bit is a sum of at least two message bits. Other embodiments use a code in which every codeword bit is a function of at least two message bits. Persons of ordinary skill in the art should appreciate other techniques which result in no message bits being carried in the clear, and all such variations are intended to be within the scope of this disclosure.

Figure 2:
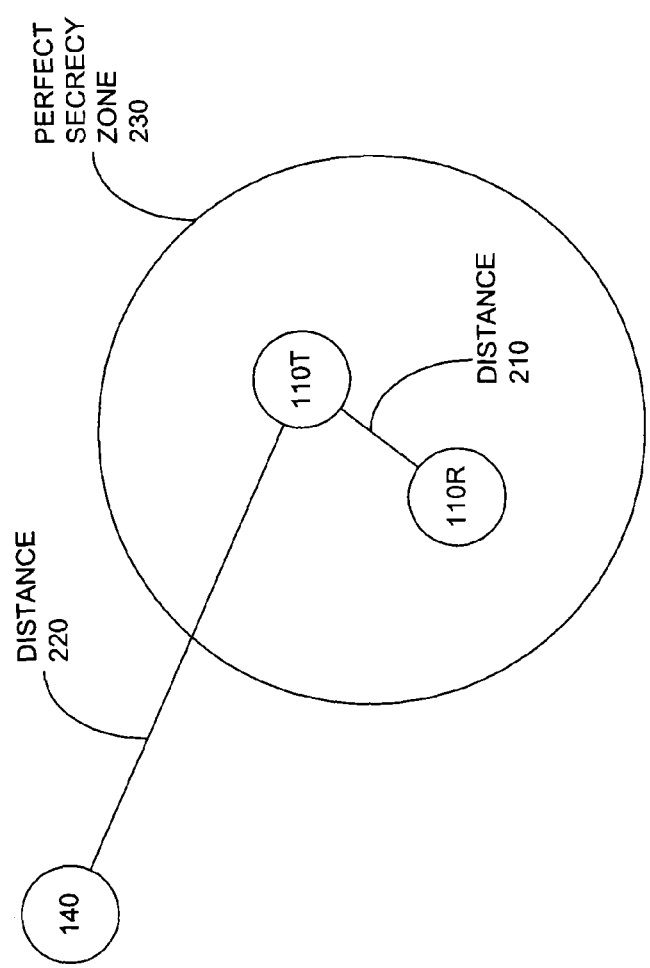
FIG. 2 is a diagram of an example configuration for the transmitter and receiver of FIG. 1, according to some embodiments described herein.

The non-systematic error correcting coding techniques disclosed herein can be used to exploit the channel characteristics present when transmitter 110T and receiver 110R are relatively close to each other. As shown in FIG. 2, in this configuration the distance from transmitter 110T to receiver 110R (shown as 210) is much smaller than the distance from transmitter 110T to receiver 110R to eavesdropper 140 (shown as (220). Therefore, the signal-to-noise ratio on main channel 120 ($SNR_M$) is better than the signal-to-noise ratio on eavesdropper channel 150 ($SNR_E$), as a person of ordinary skill in the art would appreciate from basic communications theory.

The non-systematic error correcting coding techniques disclosed herein can exploit this channel property to insure that information on main channel 120 remains secret from eavesdropper channel 150 while also providing high reliability on main channel 120. A non-systematic ECC used by encoder 170 and decoder 180 provides a perfect secrecy zone 210 within a given distance Z from transmitter 110T. In the example configuration shown in FIG. 2, perfect secrecy zone 210 is a circle, so that Z is the radius of that circle. Outside perfect secrecy zone 210, the signal-to-noise ratio on eavesdropper channel 150 ($SNR_E$) results in a bit error rate on eavesdropper channel 150 ($BER_E$) that is high enough to guarantee that a specific percentage of the bits obtained from transmissions by transmitter 110T are unreliable. Non-systematic ECC encoder 170 and non-systematic ECC decoder 180 use a non-systematic ECC, which is designed to ensure that this unreliable information renders eavesdropper 140 unable to reliably decode messages sent on main channel 120. A suitably designed non-systematic ECC ensures that the bit error rate experienced by the eavesdropper is higher than the bit error rate produced by a conventional error correcting code. In fact, persons of ordinary skill in the art should appreciate that Shannon's information theory can be used to show the existence, in certain situations, of non-systematic ECCs that make the reliability of the eavesdropper's information as low as possible. In various embodiments, a non-systematic ECC used by encoder 170 is based on a linear block code, is a turbo code, or is a low density parity check code.

Some embodiments of device 110 support a number of different non-systematic ECCs, which allows flexibility in the level of security that is required against an eavesdropper. For example, the particular non-systematic ECC that is chosen or selected for use by non-systematic ECC encoder 170 can be less complex if it is known that the eavesdropper is more than a certain distance away, since this distance affects the error rate on the channel. Some embodiments of device 110 adapt to changing channel conditions by dynamically selecting an appropriate non-systematic ECC. Still other embodiments use a non-systematic ECC when eavesdropper channel 150 is not much noisier than main channel 120, while switching to a systematic ECC when eavesdropper channel 150 becomes much noisier than main channel 120.

To create a situation where the eavesdropper's information is unreliable, non-systematic ECC encoder 170 and non-systematic ECC decoder 180 use a non-systematic ECC designed to have specific properties or characteristics related to $SNR_M$ and $SNR_E$. (As discussed earlier, $SNR_M$ and $SNR_E$ are turn related to the distance between transmitter 110T and receiver 110R, and the distance from transmitter 110T to eavesdropper 140, respectively.) These code characteristics will now be described in further detail in connection with FIG. 3, FIG. 4A and FIG. 4B.

Figure 3:
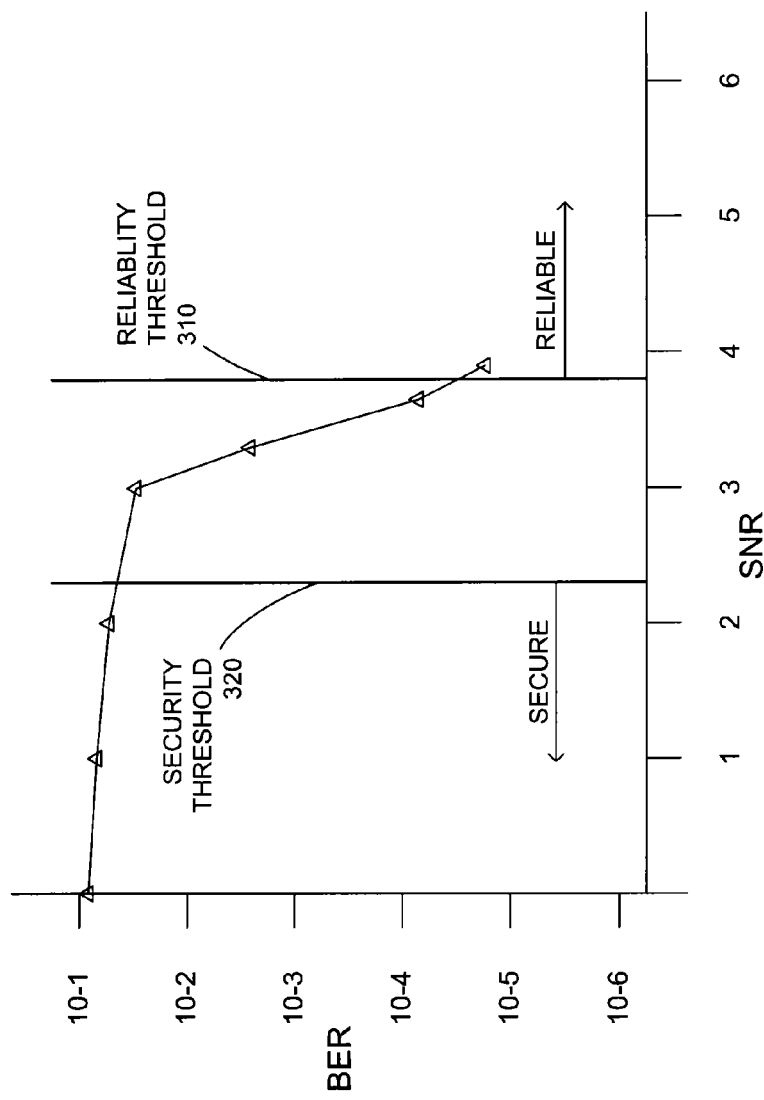
FIG. 3 is a graph illustrating performance of a non-systematic ECC, according to embodiments described herein.

FIG. 3 describes a non-systematic ECC used by an example embodiment of encoder 170 in terms of bit error rate (BER) performance vs. SNR. As can be seen in the graph of FIG. 3, for a given expected SNR on main channel 120 ($SNR_M$), the example non-systematic ECC produces a bit error rate (on main channel 120) which exceeds a predetermined reliability threshold 310. For a given expected SNR on eavesdropper channel 150, the same non-systematic ECC produces a bit error rate (eavesdropper channel 150) which is less than a predetermined security threshold 320. The non-systematic ECC used by non-systematic ECC encoder 170 could thus be described as exhibiting a sharp waterfall region (sharp drop off between reliability threshold 310 and security threshold 320) as well as high BER at low SNRs. The steep increase in BER seen in FIG. 3 is a result of not transmitting any message bits in the clear and instead using the codeword to hide all information about the message bits.

Various embodiments of encoder 170 achieve a larger or smaller perfect secrecy zone 210 by using a non-systematic ECC with a slightly different SNR vs. BER curve. For example, a larger perfect secrecy zone 210 is achieved by using a code which has a lower BER at a high SNR as compared to FIG. 3, i.e., reliability threshold 310 moves to the right. Codes that provide a larger secrecy zone may be relatively complex. A smaller perfect secrecy zone 210 is achieved by using a code in which reliability threshold 310 moves to the left as compared to FIG. 3.

FIGS. 4A and 4B are graphs illustrating relative performance of a non-systematic ECC and a systematic ECC using a logarithmic scale and a linear scale, respectively. In linearly scaled FIG. 4A, curve 410 is a plot of BER vs. SNR for a systematic ECC, while curve 420 is a plot of BER vs. SNR for a non-systematic ECC. In logarithmically scaled FIG. 4B, curve 430 is a plot of BER vs. SNR for a systematic ECC, while curve 440 is a plot of BER vs. SNR for a non-systematic ECC.

As can be seen in both FIGS. 4A and 4B, a non-systematic ECC exhibits a much steeper increase in the BER as the SNR on main channel 120 decreases, a property that provides message security as long as all unauthorized eavesdroppers operate at a lower SNR than legitimate users. Specifically, a relatively small impairment of the SNR results in BERs of 0.4 and above, such that an eavesdropper is unable to extract much useful information from the received signal. In contrast, FIGS. 4A and 4B illustrate that when a systematic ECC is used, such a high BER on eavesdropper channel 150 requires the eavesdropper to operate at a significantly lower SNR.

A person of ordinary skill in the art would thus understand from the graphs in FIG. 3, FIG. 4A, and FIG. 4B that in some embodiments, these predefined characteristics are such that when the eavesdropper device is more than a predetermined distance Z from the transmitter, at least a predefined portion of the message is unreliable. This predefined portion of unreliable bits renders the eavesdropper unable to reliably decode messages on the main channel. Such a person would also understand from these graphs that in other embodiments, these predefined characteristics are such that when the eavesdropper device is more than a predetermined distance Z from the transmitter, the bit error probability on the eavesdropper channel does not exceed a predetermined security threshold, while a bit error probability on the main channel does exceed a predetermined reliability threshold. The encoded bits include some portion of bits which are unreliable, thus rendering the eavesdropper unable to reliably decode messages on the main channel.

FIG. 5 is a logical block diagram of a system 500 with a secure physical layer, according to some embodiments. System 500 includes transmitter 110T and receiver 110R, each of which includes secure physical layer 510, link layer 520, and additional layer 530. System 500 takes advantage of the presence of non-systematic ECC encoder 170, which provides security, within physical layer 510. This security provided at the physical layer obviates the need for cryptographic algorithms at a higher layer. In contrast, conventional communication systems provide security by employing symmetric and/or asymmetric cryptographic algorithms which are implemented at a layer above the physical layer (e.g., wired equivalent privacy (WEP) at the media access control (MAC) layer, internet protocol security (IPSec) at the network layer, secure sockets layer (SSL) at the application layer, etc.

The non-systematic ECC techniques disclosed herein do provide security at the physical layer, but these techniques can also be used in combination with any protocol layer above the physical layer. Thus, some embodiments of transmitter 110T and receiver 110R include encryption at higher layers of the protocol stack in addition to the security provided by non-systematic ECC encoder 170 at the physical layer. When security at the physical layer combined with encryption at a higher layer, principles of information-theoretic security show that as long as the eavesdropper is more than a certain distance away from the friendly transmitter and receiver, the eavesdropper will necessarily have a number of errors after decoding and that this number of errors, when combined with a particular cryptographic code, will render the eavesdropper virtually unable to decode the message.

Figure 6:
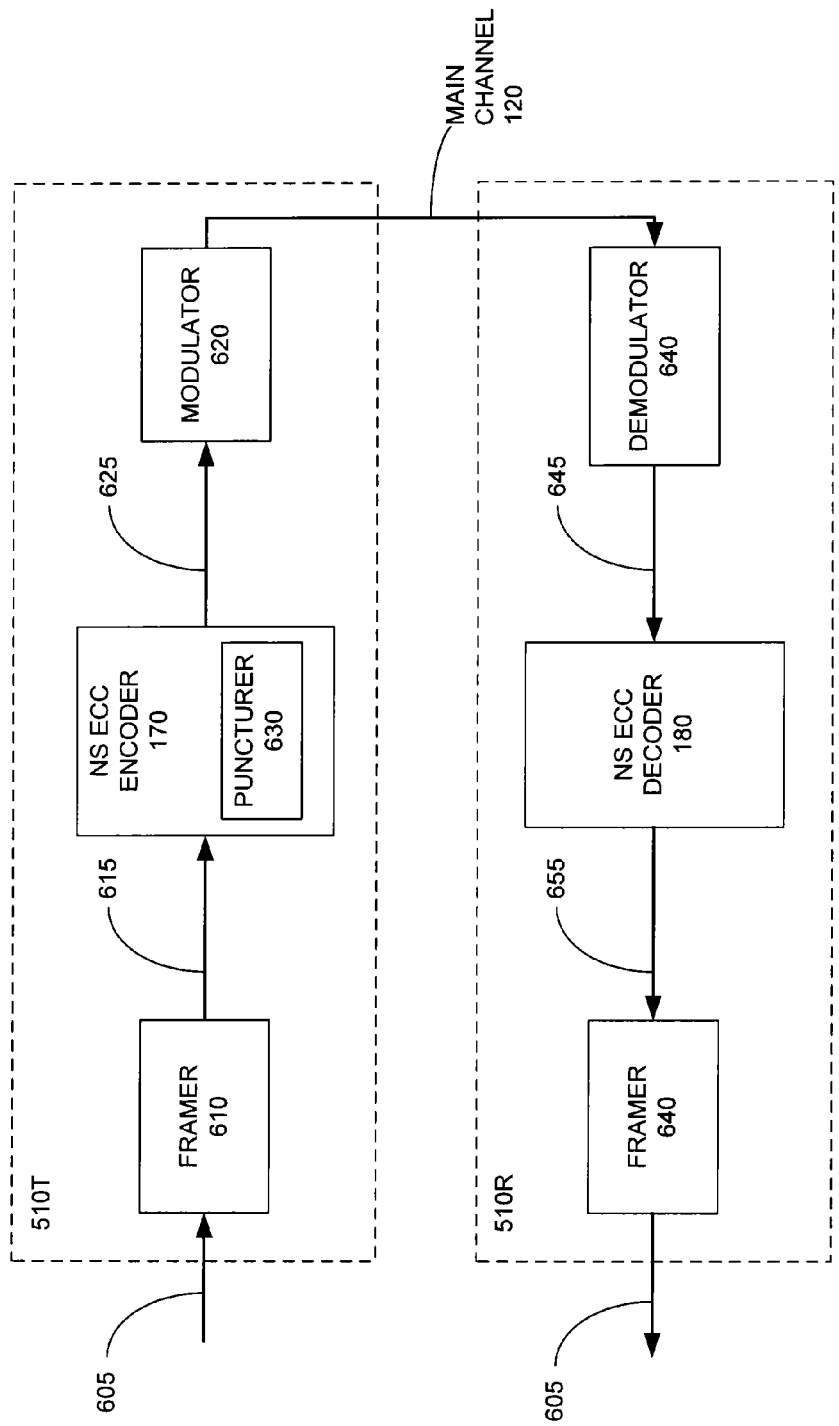
FIG. 6 is a block diagram illustrating selected components of a secure physical layer from FIG. 5, according to some embodiments described herein.

FIG. 6 is a block diagram illustrating selected components of one embodiment of secure physical layer 510. A transmit secure physical layer 510T includes a framer 610, non-systematic ECC encoder 170, and a modulator 620. Framer 610 operates on a message 605 from a higher protocol layer. Message 605 is a stream of bits. Framer 610 divides the bit stream into blocks, and outputs a block 615, which may include header and trailer information. Block 615 is encoded by non-systematic ECC encoder 170. Some embodiments of encoder 170 include puncturer 630. Non-systematic ECC encoder 170 produces one or more encoded bits 625. Encoded bits 625 are modulated by modulator 620 to produce symbols, which are transmitted over main channel 120 to a receive secure physical layer 510R.

Receive secure physical layer 510R includes a demodulator 640, non-systematic ECC decoder 180, and a framer 650. Symbols received on main channel 120 are mapped to bits 645 by demodulator 640, and bits 645 are decoded by non-systematic ECC decoder 180. The group of decoded bits 655 is received by framer 650, which strips off header/trailer bits as necessary to reveal originally transmitted message 605. Message 605 may then be passed up to a higher protocol layer. Notably, message 605 is reconstructed without the transmission of any bits of the original message in the clear.

In some embodiments, one side of the communication channel has less processing or computing capabilities than the other. In some embodiments, the properties of the communication channel may be asymmetrical (e.g., 10 Mbit/sec in one direction and 1 Mbit/sec in the other). In such embodiments, one side may use different modulation and/or framing techniques when transmitting than the other side does. As a non-limiting example, one side may transmit using quadrature amplitude modulation with 16 different symbols (QAM16) while the other side may transmit using quadrature amplitude modulation with 64 different symbols (QAM64).

Figure 7:
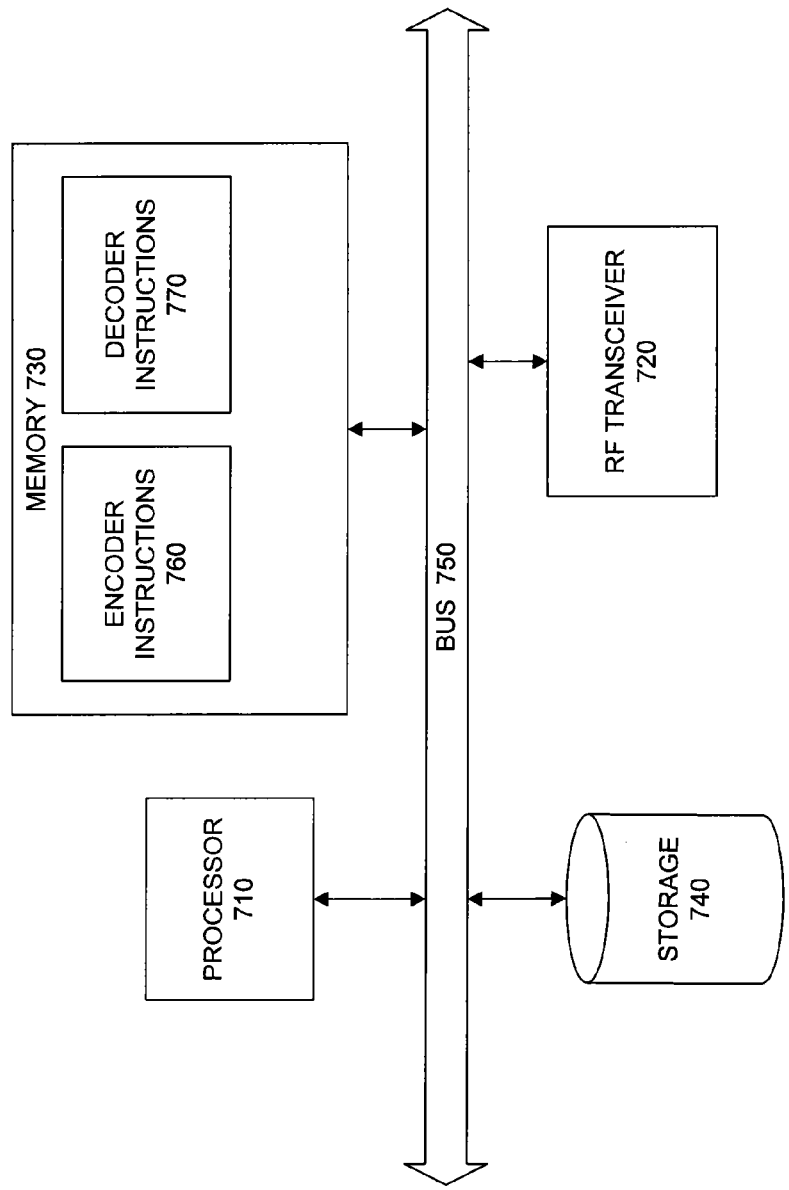
FIG. 7 is a hardware block diagram of a device from FIG. 1, according to some embodiments described herein.

FIG. 7 is a hardware block diagram of an embodiment of device 110 in which encoder 170 and decoder 180 are implemented in software, that is, as instructions stored in a memory and executed by a suitable microprocessor, digital signal processor, network processor, microcontroller, etc. Device 110 contains a number of components that are well known in the art of data communications, including a processor 710, an RF transceiver 720, memory 730, and non-volatile storage 740. These components are coupled via bus 750. RF transceiver 720 may support one or more of a variety of different networks using various technologies, medias, speeds, etc. A non-limiting list of examples of wireless technologies includes: radio frequency identification (RFID) networks (e.g., ISO 14443, ISO 18000-6); wireless local area networks (e.g. IEEE 802.11, commonly known as WiFi); wireless wide area networks (e.g., IEEE 802.16, commonly known as WiMAX); wireless personal area networks (e.g., Bluetooth™, IEEE 802.15.4) and wireless telephone networks (e.g., CDMA, GSM, GPRS, EDGE).

Examples of non-volatile storage include, for example, a hard disk, flash RAM, flash ROM, EPROM, etc. memory 730 contains encoder instructions 760 and/or decoder instructions 770, which programs or enables processor 710 to implement the functions of encoder 170 and/or decoder 180. Omitted from FIG. 7 are a number of conventional components, known to those skilled in the art, that are not necessary to explain the operation of device 110.

Figure 8:
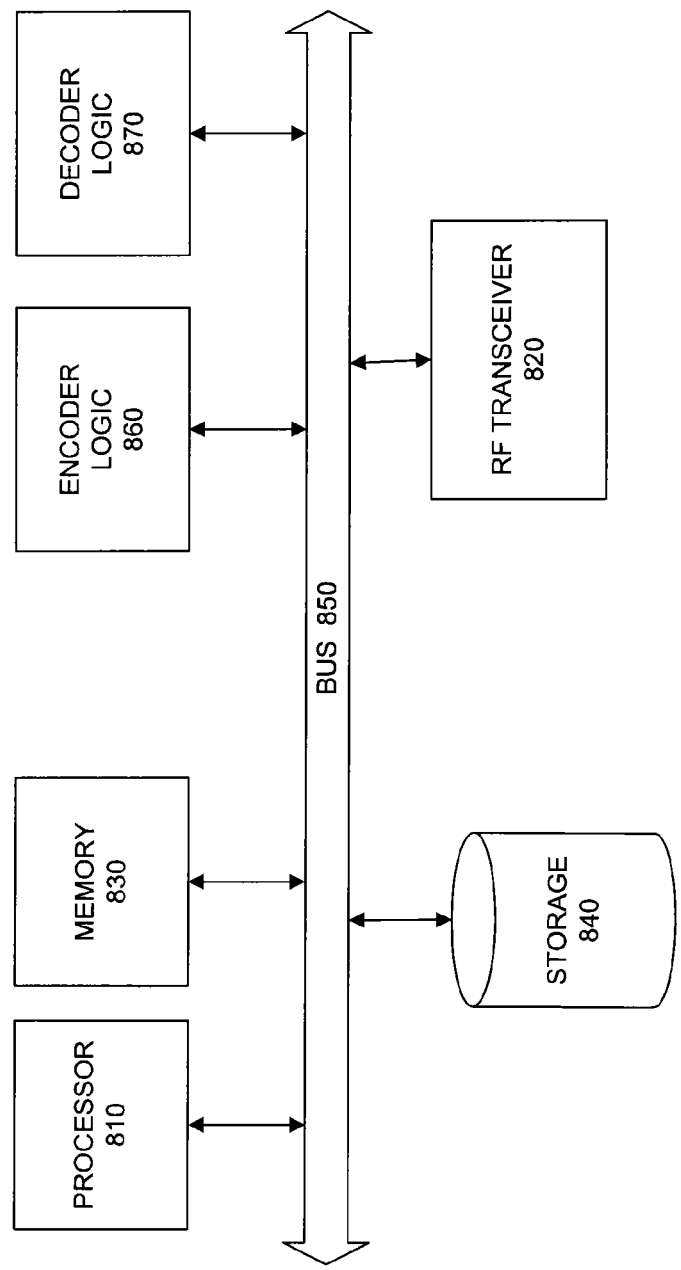
FIG. 8 is a hardware block diagram of another device from FIG. 1, according to some embodiments described herein.

FIG. 8 is a hardware block diagram of an embodiment of device 110 in which encoder 170 and decoder 180 are implemented in hardware logic, as encoding logic 810 and decoding logic 820. Technologies used to implement encoding logic 810 and decoding logic 820 include, but are not limited to, a programmable logic device (PLD), a programmable gate array (PGA), field programmable gate array (FPGA), an application-specific integrated circuit (ASIC), a system on chip (SoC), and a system on packet (SoP). The embodiment of FIG. 8 may also contain software to implement functions such as management, initialization of hardware, protocol stack layers, etc., so processor 710 and memory 730 are also included. Omitted from FIG. 8 are a number of conventional components, known to those skilled in the art, that are not necessary to explain the operation of device 110. In yet another embodiment of device 110 (not illustrated), encoder 170 and/or decoder 180 are implemented by a combination of software (i.e., instructions executed on a processor) and hardware logic.

Some embodiments of encoder 170 and decoder 180 are stored on a computer-readable medium, which in the context of this disclosure refers to any structure which can contain, store, or embody instructions executable by a processor. The computer readable medium can be, for example but not limited to, based on electronic, magnetic, optical, electromagnetic, infrared, or semiconductor technology.

Specific examples of a computer-readable medium using electronic technology would include (but are not limited to) the following: a random access memory (RAM); a read-only memory (ROM); and an erasable programmable read-only memory (EPROM or Flash memory). A specific example using magnetic technology includes (but is not limited to) a disk drive; and a portable computer diskette. Specific examples using optical technology include (but are not limited to) a compact disk read-only memory (CD-ROM) or a digital video disk read-only memory (DVD-ROM).

Any process descriptions or blocks in flowcharts would be understood as representing modules, segments, or portions of code which include one or more executable instructions for implementing specific functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method for secure communication in a system involving a transmitter device, a receiver device, and an eavesdropper device, the transmitter device being configured to transmit to the receiver device on a main channel, the eavesdropper device being configured to listen on an eavesdropper channel to the transmitter device, the main channel having a first signal-to-noise ratio, the eavesdropper channel having a second signal-to-noise ratio, the method implemented in the transmitter device and comprising:

encoding a message with a non-systematic error correcting code (NS ECC) to produce an encoded message without the message being carried in the clear; and transmitting the encoded message to the receiver device using the main channel;

wherein the NS ECC has a defined characteristic such that when the eavesdropper device is more than a predetermined distance from the transmitter device, at least a portion of the message is unable to be recovered by the eavesdropper device decoding the encoded message.

2. The method of claim 1, wherein the message is encoded at a physical layer.

3. The method of claim 1, wherein the main channel comprises a wireless channel.

4. The method of claim 1, wherein the NS ECC comprises a low density parity check code.

5. A transmitter device for secure communication in a system involving the transmitter device, a receiver device, and an eavesdropper device, the transmitter device being configured to transmit to the receiver device on a main channel, the eavesdropper device being configured to listen on an eavesdropper channel to the transmitter device, the main channel having a first signal-to-noise ratio, the eavesdropper channel having a second signal-to-noise ratio, the transmitter device comprising:

an encoder configured to apply a non-systematic error correcting code (NS ECC) to a message to produce a plurality of encoded bits, wherein the plurality of encoded bits results in the message not being carried in the clear; and a transceiver configured to transmit the plurality of encoded bits to the receiver device using the main channel;

wherein the NS ECC has a defined characteristic such that when the eavesdropper device is more than a predetermined distance from the transmitter device, a bit error probability on the eavesdropper channel does not exceed a predetermined security threshold while a bit error probability on the main channel exceeds a predetermined reliability threshold; and wherein a subset of the plurality of encoded bits render the eavesdropper device unable to accurately decode the message.

6. A system for secure communication, the system comprising:

a receiver device; and a transmitter device in communication with the receiver device using a main channel, the transmitter device configured to communicate a message without transmitting any of the message in the clear by applying a non-systematic error correcting code (NS ECC) and transmitting a portion of a plurality of encoded bits for the message;

wherein the receiver device is configured to recover the message from the plurality of encoded bits that were transmitted; and wherein the NS ECC has a defined characteristic such that when an eavesdropper device listening on an eavesdropper channel to the transmitter device is more than a predetermined distance from the transmitter, a bit error probability for the eavesdropper channel does not exceed a predetermined security threshold while a bit error probability for the main channel exceeds a predetermined reliability threshold; and wherein the plurality of encoded bits includes a plurality of bits that render the eavesdropper unable to accurately decode the message.

7. The system of claim 6, wherein the main channel comprises a wireless channel.

8. The system of claim 6, wherein the transmitter device is a radio frequency identification (RFID) tag.

9. A transmitter device for secure communication in a system involving the transmitter device, a receiver device, and an eavesdropper device, the transmitter device configured to transmit to the receiver device on a main channel, the eavesdropper device configured to listen on an eavesdropper channel to the transmitter device, the main channel having a first signal-to-noise ratio, the eavesdropper channel having a second signal-to-noise ratio, the transmitter device comprising:

a physical layer component of a protocol stack, the physical layer component configured to receive a message from another component of the protocol stack, the physical layer component comprising an encoder configured to apply a non-systematic error correcting code (NS ECC) to the message to produce a plurality of encoded bits, the plurality of encoded bits being produced such that the message is not carried in the clear; and an RF transceiver configured to transmit the plurality of encoded bits to the receiver device using the main channel.

10. An encoder residing in a transmitter device, the encoder providing secure communication in a system involving the transmitter device, a receiver device, and an eavesdropper device, the transmitter device being configured to transmit to the receiver device on a main channel, the eavesdropper device being configured to listen on an eavesdropper channel to the transmitter device, the main channel having a first signal-to-noise ratio, the eavesdropper channel having a second signal-to-noise ratio, the encoder comprising:

coding logic configured to apply a non-systematic error correcting code (NS ECC) to a message to produce a plurality of encoded bits such that the message is not carried in the clear; and puncture logic configured to puncture at least a portion of the plurality of encoded bits and to provide the at least a portion of the plurality of encoded bits that were punctured for transmission over the main channel;

wherein the NS ECC has a defined characteristic such that when the eavesdropper device is more than a predetermined distance from the transmitter device, a bit error probability on the eavesdropper channel does not exceed a predetermined security threshold while a bit error probability on the main channel exceeds a predetermined reliability threshold; and wherein a subset of the plurality of encoded bits render the eavesdropper unable to accurately decode the message.

11. The encoder of claim 10, wherein the NS ECC comprises a low density parity check code.

12. The encoder of claim 10, wherein the puncture logic is configured to puncture all of the plurality of encoded bits.

* * * * *

UNITED STATES PATENT AND TRADEMARK OFFICE
CERTIFICATE OF CORRECTION

PATENT NO. : 8,667,380 B2 Page 1 of 1
APPLICATION NO. : 13/123669
DATED : March 4, 2014
INVENTOR(S) : McLaughlin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 322 days.

Signed and Sealed this
Twenty-ninth Day of September, 2015

Michelle K. Lee
*Director of the United States Patent and Trademark Office*